United States Patent [19]  [11] 3,801,351
Dauksys  [45] Apr. 2, 1974

[54] TREATMENT OF HIGH MODULUS GRAPHITE FIBERS TO IMPROVE THEIR BONDING CHARACTERISTICS

[75] Inventor: Richard J. Dauksys, Bellbrook, Ohio

[73] Assignee: The United States of America as represented by the Secretary of the Air Force, Washington, D.C.

[22] Filed: May 5, 1972

[21] Appl. No.: 250,715

[52] U.S. Cl. ............... 117/47 R, 117/62, 117/169 R
[51] Int. Cl. ......................... B44d 1/14, B44d 1/092
[58] Field of Search ........ 117/47 R, 228, 169 R, 62, 117/118, DIG. 11

[56] References Cited
UNITED STATES PATENTS

| | | | |
|---|---|---|---|
| 3,573,961 | 4/1971 | Hawkins et al. | 117/47 |
| 3,627,570 | 12/1971 | Cass et al. | 117/169 R X |
| 3,627,571 | 12/1971 | Cass et al. | 117/228 X |
| 3,635,675 | 1/1972 | Ezekiel | 264/29 X |
| 3,720,536 | 3/1973 | Scola et al. | 117/228 X |

Primary Examiner—William D. Martin
Assistant Examiner—Stuart D. Frenkel

[57] ABSTRACT

A method of improving the bonding characteristics of high modulus graphite fibers is provided that comprises treating the fibers with a solution of osmium or ruthenium tetroxide and sodium iodate in water, dioxane or aqueous dioxane; washing and thereafter drying the treated fibers; contacting the treated fibers with a solution of tin tetrachloride in 2-butanone; and heating the fibers to remove the 2-butanone solvent. When graphite fibers so treated are used as a reinforcing material for epoxy resins, a composite is obtained that has a greatly improved interlaminar shear strength.

5 Claims, No Drawings

TREATMENT OF HIGH MODULUS GRAPHITE FIBERS TO IMPROVE THEIR BONDING CHARACTERISTICS

FIELD OF THE INVENTION

This invention relates to a method for treating high modulus graphite fibers so as to improve the bonding of the fibers to resinous materials. In one aspect it relates to composites in which the treated fibers function as a reinforcing material for epoxy resins.

BACKGROUND OF THE INVENTION

It is well known to use various reinforcing agents or fillers, such as carbon black, asbestos, glass fibers, silica, aluminum silicate and the like, to impart desired properties to elastomeric or resinous polymers. In recent years carbon and graphite fibers have been utilized extensively as reinforcing materials. And because of their very high modulus of elasticity, graphite fibers have proven to be very useful in fabricating structural composites that may be subjected to great stress as in aircraft and aerospace vehicles.

Epoxy resins or polyepoxides have been used as the matrix for graphite fibers in fabricating composites or laminates to be used, e.g., as structural members. However, a problem encountered with using epoxy resins as the matrix resides in the difficulty in establishing a strong bond or coupling between the fibers and the resin. Attempts have been made to overcome this problem by modifying the fibers, but any improvement in shear strength of the product has been accompanied by a degradation of other properties, e.g., tensile strength, by 25 percent or more.

It is an object of this invention therefore, to provide a method for modifying graphite fibers so as to improve their bonding relationship with epoxy resins.

A further object of the invention is to provide treated graphite fibers which, when used as a reinforcing material for epoxy resins, result in composites having an improved interlaminar shear strength.

Another object of the invention is to provide a composite comprising an epoxy resin matrix having a high shear strength.

Still another object of the invention is to provide a method of preparing a composite comprising an epoxy resin matrix.

Other objects and advantages of the invention will become apparent to those skilled in the art upon consideration of the accompanying disclosure.

SUMMARY OF THE INVENTION

The instant invention lies in the discovery of a method for treating high modulus graphite fibers whereby their capability to bond to or couple with epoxy resins is improved. The method comprises the steps of immersing the fibers in a solution of osmium or ruthenium tetroxide and sodium idoate in water, aqueous dioxane or dioxane; water washing and drying the fibers after removal from the solution; contacting the dried fibers with a solution of tin tetrachloride ($SnCl_4$); and after removal from the latter solution evaporating the solvent from the fibers. The use of graphite fibers treated by this method in forming composites with epoxy resins results in products having an improved interlaminar shear strength with a minimal effect on other mechanical properties.

The graphite fibers used in the process are readily available from commercial sources. As precursors, a variety of polymeric or resinous materials can be utilized such as cellulosic fibers, including regenerated cellulose or rayon yarns; polyacrylonitrile; copolymers of acrylonitrile and a minor amount of, e.g., methyl acrylate, vinyl, acetate, styrene, vinyl toluene, vinylidene chloride, vinyl methyl phthalate, ethylene, and the like; polybenzimidazoles, such as poly-2,2'-(m-phenylene)-5,5(dibenzimidazole; aromatic polyamides; aromatic polyimides; petroleum pitch; and the like.

The graphite fibers are often prepared by a three-step process, involving preoxidation at 200° to 350° C followed by carbonization accomplished by heating the oxidized fibers in an inert atomsphere at 1,000° to 1,500° C. Thereafter, the carbonized fibers are heated in an inert atmosphere at a temperature ranging, e.g., from 1,800° to 3,000° C to provide graphite fibers. A method for preparing graphite fibers having a very high modulus of elasticity is disclosed in U.S. Pat. No. 3,635,675.

The epoxy resins with which the treated graphite fibers are employed are well known and are readily available from commercial sources. In "Polymer Processes," Interscience Publishers, Inc, pages 429–474 and 506–509 (1965), epoxy resins are described by C. E. Schildknecht. The polyepoxides, which are characterized by the presence of oxirane end groups, may be prepared, as described in the aforementioned publication, by the reaction between phenolic compounds and epichlorohydrin. Epoxy resins are also disclosed in numerous patents, including U.S. Pat. Nos. 2,643,239; 2,694,695; 3,098,056; and 3,403,131. Curing of the polyepoxides, which are usually in the form of a viscous liquid, may be accomplished by mixing and heating the polymer with from about 1 to 30 weight percent of a hardener or curing agent. A solvent may also be included in the system in order to control the viscosity of the polyepoxide. In the normal curing operation, cross-linking occurs as a result of the interaction of the terminal epoxy groups, the curing agent and some of the pendant hydroxyl groups.

A large number of the commercially available resins are prepared by reacting epichlorohdyrin and Bisphenol A [2,2-bis(4-hydroxyphenyl) propane]. Another example of an epoxy-type resin that is extensively used is epoxy-novolak resins prepared from the reaction of novolaks (phenol-formaldehyde resins) to attach epoxy groups to the polymer chain. The suppliers of epoxy resins generally furnish the hardening agent for the particular resin, together with information as to amount to use, and the cure temperature and time. Examples of suitable hardening agents include polycarboxylic acid anhydrides, such as phthalic anhydride, pyromellitic anhydride, and maleic anhydride, which may be used with an amine accelerator, such as N-benzyldimethylamine or 2,4,6-tris(dimethylaminomethyl)phenol.

From the foregoing discussion of graphite fibers and epoxy resins, it is seen that such materials are well known in the art. Furthermore, information concerning the materials are readily available in the literature and from manufacturers. The present invention is primarily concerned with the treatment of graphite fibers from any source and the composites prepared with the treated fibers using any epoxy resin as the matrix.

As mentioned hereinbefore, in the initial step of the method, the graphite yarn is immersed in a solution of osmium or ruthenium tetroxide and sodium iodate in water, dioxane or aqueous dioxane. The amount of water and/or dioxane used as the solvent can vary from zero to 100 volume percent water and from zero to 100 volume percent dioxane, based on a total of 100 volume percent. However, it is often preferred to utilize a solvent containing in the range of 40 to 60 volume percent dioxane and 40 to 60 volume percent water. While the amounts of osmium tetroxide and sodium iodate can vary within rather broad limits, it is usually preferred to employ from about 0.05 to 1.0 gram of osmium or ruthenium tetroxide and from about 25 to 200 grams of sodium iodate per liter of solvent. In preparing the solution, the two materials can be separately added to the solvent. However, in a preferred procedure, the osmium or ruthenium tetroxide is added to a small portion of dioxane, e.g., 10 to 100 milliliters, after which it is mixed with the solvent. The sodium iodate can be added to the solvent either before or after addition of the tetroxide. During the immersion step, the solution is maintained from about ambient temperature to 90° C, preferably from about 80° to 90° C. The immersion time can vary within rather broad limits, e.g., from about 1 minute to 8 hours and longer. The amount of solution that is actually used is that which is sufficient to provide good contact between the fibers and the solution. For example, 1 liter of solution for 0.5 pound of fibers gives satisfactory results.

After the immersion step is completed, the fibers are removed from the solution and water washed. In the washing operation, it is preferred to use hot distilled water, e.g., water at a temperature ranging from about 50° to 80° C. Thereafter, the washed fibers are dried, preferably in a vacuum oven. The fibers remain in the oven for a time sufficient to ensure that they are completely dried. This is usually accomplished in from 30 minutes to 1 hour with the oven maintained at a temperature ranging from about 90° to 110° C.

The dried fibers are next brought into contact with a solution of tin tetrachloride in a suitable solvent therefor. The amount of the stannic chloride employed is usually in the range of about 0.2 to 1.0 volume percent of the solvent. Examples of solvents that can be used include acetone, 2-butanone, dimethylsulfoxide, dimethylformamide, ethyl alcohol, propyl alcohol, and the like. It is often preferred to employ a ketone as the solvent. The contact of the fibers takes place with the solution at about room temperature (25° C). The fibers are in contact with the tin tetrachloride solution for only a relatively short period of time, e.g., from about 15 to 60 seconds after which the fibers are heated to a temperature sufficient to evaporate the solvent. The temperature used will, of course, depend upon the particular solvent employed in preparing the solution. Longer contact times, e.g., up to 30 minutes, can be utilized, particularly in batch operations. The heating step can be advantageously conducted by continuously passing the fibers under an infrared lamp although other well known driers can be used. Also, it is to be understood that the solvent can be evaporated merely by allowing the fibers to stand at room temperature. After the fibers have been treated as described, they are now in a form that renders them particularly useful as a reinforcing material in the fabrication of composites, utilizing an epoxy resin as the matrix.

Reference to the following illustrative examples, which are not intended to be unduly limitative of the invention, will provide a more comprehensive understanding of the invention.

EXAMPLE I

A series of runs was conducted in which graphite fibers were treated in accordance with the method of this invention after which they were used with an epoxy resin to prepare composites. A control run was also conducted in which the same graphite fibers, but untreated, and the same epoxy resin were used in fabricating a composite.

The graphite fibers used were a product sold by Union Carbide under the trademark Thornel 50. The fibers had been sized with water. The product was in the form of a 2-ply yarn, twisted 1.5 to 2 turns per inch, having 720 filaments per ply. The yarn had a modulus of elasticity of $50 \times 10^6$ psi and a tensile strength of $325 \times 10^3$ psi. The single filaments had a diameter of about 0.0003 inch and a density of about 1.5 g/cc. Thornel 50 graphite fibers are prepared from a cellulosic precursor.

In carrying out the runs according to the present method, hereinafter designated as runs 1–6, the graphite fibers were initially immersed in a solution of osmium tetroxide and sodium iodate in 150 mls of dioxane and 200 mls of water. 30 grams of sodium iodate and 0.2125 gram of osmium tetroxide were used. The yarn remained in the solution for a period of 30 minutes with the temperature of the solution being maintained at about 71° C. At the end of the immersion period, the yarn in each run was removed from solution, washed with hot, distilled water and dried for 45 minutes at 106° C under a vacuum.

Upon completion of the above-described steps, the washed and dried fibers were pulled successively through a room temperature solution containing 0.2 ml of tin tetrachloride in 50 mls of 2-butanone, under an infrared lamp to evaporate the 2-butanone, and through a solution of an epoxy resin. After passage through the epoxy resin solution, the fibers were wound on a cylindrical mandrel so as to form thereon a monolayer tape. The epoxy resin system, which was one supplied by Union Carbide, had the formulation shown in Table I.

TABLE I

|  | Parts by weight |
| --- | --- |
| Epoxy resin ERL2256[1] | 100 |
| Hardener ZZL0820[1] | 27 |
| 2-Butanone | 90 |

(1) Union Carbide identification symbol.

After appropriate B-staging (exposure overnight to atmosphere at room temperature), the tape was cut to mold dimensions. 10 plies of the tape were placed on top of one another in a steel mold and molded according to the manufacturer's recommendations. Thus, the mold was first heated at 180° F for 2 hours followed by heating at 300° F for 4 hours. The mold was cooled to room temperature between the heating cycles and was maintained at 100 psi during the cycles.

The composites were tested to determine their interlaminar shear strength. The results of the tests are shown below in Table II.

TABLE II

| Run No. | Shear strength, psi |
|---|---|
| Control | 3600 |
| 1 | 4900 |
| 2 | 4200 |
| 3 | 4800 |
| 4 | 5100 |
| 5 | 4800 |
| 6 | 4700 |

The data in the foregoing table demonstrate that the shear strengths of the composites prepared with graphite fibers treated according to the method of this invention were substantially greater, e.g., about 35 percent greater, than that of the composite fabricated with untreated graphite fibers. The greater shear strengths obtained indicate that there is a substantial improvement in the coupling or bonding of the treated graphite fibers to the epoxy resin. Although it is not intended to limit the invention to a particular theory, it is believed that hydroxyl functionality on the graphite fibers is increased by reaction of the osmium tetroxide with carbon-to-carbon double bonds. (The reaction of the osmium tetroxide is regenerative so that it can be reused in subsequent solutions merely by adding additional sodium iodate.) The hydroxyl groups react with the sodium iodate to form an increased number of carbonyl groups which complex with the tin tetrachloride. The subsequent reaction of the complexes, which are also increased in number, with oxirane groups of the epoxy resin results in improved coupling between the fibers and the epoxy resin matrix.

EXAMPLE II

A run is conducted in which the graphite fibers used are the same as those described in Example I. The fibers, as received from the manufacturer wound on a spool, are immersed for 3 minutes in a solution containing 0.065 gram of osmium tetroxide and 85.8 grams of sodium iodate in one liter of solvent. The solvent, maintained at 65° C, consists of 572 mls of water and 428 mls of dioxane. Thereafter, the spool and dried yarn are immersed in a room temperature solution of stannic chloride in 2-butanone (0.4 volume percent $SnCl_4$) for a period of 25 minutes. The fibers impregnated with the stannic chloride solution are then wound directly onto a mandrel after passing through a vacuum oven to evaporate the 2-butanone solvent. The procedure described in Example I is then followed in preparing a composite having a shear strength comparable to those of Example I which were prepared with the treated fibers. The procedure described in this example has the advantage of eliminating the intermediate steps of the filament winding operation as described in Example I.

As will be evident to those skilled in the art, modifications of the present invention can be made in the light of the foregoing disclosure without departing from the spirit or scope of the invention.

I claim:

1. A method of improving the bonding characteristics of graphite fibers which comprises the steps of:
   a. immersing the fibers in a solution of osmium or ruthenium tetroxide and sodium iodate in water, dioxane or aqueous dioxane;
   b. removing the fibers from the solution;
   c. water washing and thereafter drying the removed fibers;
   d. contacting the dried fibers with a solution of tin tetrachloride in a solvent therefor; and
   e. evaporating the solvent from the fibers recovered from step (d).

2. The method according to claim 1 in which the solvent for osmium or ruthenium tetroxide and sodium iodate contains in the range of 40 to 60 volume percent dioxane and 40 to 60 volume percent water; the solution contains from about 0.05 to 1.0 gram of osmium or ruthenium tetroxide and from about 25 to 200 grams of sodium iodate per liter of solvent; and the solution of tin tetrachloride contains from about 0.2 to 1.0 volume percent tin tetrachloride, based on the solvent.

3. The method according to claim 2 in which the solvent for the tin tetrachloride is a ketone.

4. The method according to claim 3 in which the ketone is 2-butanone.

5. The method according to claim 2 in which the solution of osmium or ruthenium tetroxide and sodium iodate is maintained at a temperature ranging from about room temperature to 90° C; the graphite fibers are immersed in the solution for a period ranging from about 1 minute to 8 hours; and the dried fibers are contacted with the tin tetrachloride solution at room temperature for a period ranging from about 15 seconds to 30 minutes.

* * * * *